Aug. 4, 1964 N. C. LOEBER 3,143,728

CORE STORAGE CONFIGURATION

Filed Feb. 17, 1961 2 Sheets-Sheet 1

INVENTOR.
NORMAN C. LOEBER

By Naylor G. Riddell

ATTORNEY 3,143,728
Patented Aug. 4, 1964

3,143,728

CORE STORAGE CONFIGURATION

Norman C. Loeber, San Jose, Calif., assignor to International Business Machines Corporation, New York, N.Y., a corporation of New York Filed Feb. 17, 1961, Ser. No. 90,125
9 Claims. (Cl. 340—174)

This invention relates to magnetic data storage devices and more particularly to such of those devices utilizing coincident current pulses to switch the magnetic state of a selected one of several magnetic cores. In the present invention the selection of a given storage element by coincidence of pulses is determined by time delays applied to the subject pulses.

In electronic data processing equipment one element in common use is the small toroid shaped magnetic core. Such cores are capable of being magnetized to either of two opposite conditions or states, usually arbitrarily designated North and South. By means of two windings provided on this elemental storage unit and appropriately wound, the application of a positive pulse to one will tend to magnetize the core into one of its two states, for example, North (assuming, of course, that its present state is not already North). However, in devices of the kind here involved, this single pulse is insufficient, taken by itself to change the magnetic state. Therefore, if it is desired to switch (magnetize) the core to North, a similar pulse is simultaneously applied to the other winding. Likewise, the magnetic condition of the core can be reversed by simultaneous application of two negative pulses. Finally, the material of these cores is such that unless the pulse is strong enough to completely switch the core, it stays fully magnetized in the original direction. Thus, two successive pulses will not magnetize the core. Each reversal in the magnetic state of the core can be sensed by a third winding suitably provided thereon. With this basic building block, matrices for storing binary (North-South) information have been developed comprised of many cores arranged in columns and rows. In this arrangement one particular core can be selected and magnetized by simultaneously applying a pulse to all the cores of a selected row and column. Consequently, the requisite pair of pulses appear only at the particular core selected.

In the present invention, current pulses coincide in the presence of a single magnetic core element to apply a predetermined magnetizing effect upon the selected element, but the selection is effected by time delay means.

Therefore, it is an object of the present invention to provide a novel core storage configuration.

It is another object of the present invention to provide a core storage configuration wherein one of several elemental storage units is selected by delaying the initiation of one pulse with respect to the other pulse thereby physically displacing the point where the two pulses will coincide, the means for carrying both these pulses being magnetically coupled to all the cores thereby applying a magnetic change of state at the point of coincidence.

While one embodiment utilizes a number of toroidal magnetic cores with a unit time delay provided between each core, the preferred embodiment of the invention utilizes one large magnetic core having a single continuous winding thereon for recording at various locations on the core, each such location thereby constituting a magnetic record unit corresponding to an individual core as above.

Thus, the pulses appear on the same conductor but approach from opposite directions. Coincidence of the two approaching pulses is controlled by time delay means and where they coincide, an elemental unit portion of magnetic recording material will be magnetized accordingly.

Thus, it is another object of the present invention to provide a magnetic storage configuration wherein a single conductor is utilized to magnetize a selected magnetic record unit.

Other objects, features and advantages of the invention will be apparent from the following more particular description of a preferred embodiment thereof, it will be understood by those skilled in the art that the foregoing and other changes in the form and details may be made therein without departing from the spirit and scope of the invention, as illustrated in the accompanying drawings.

Figure 3:
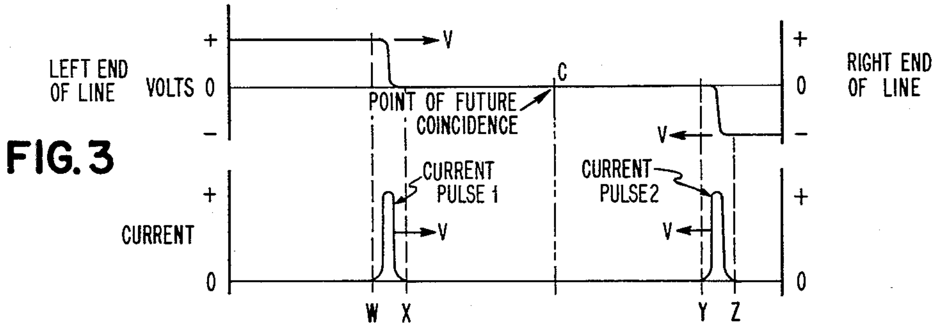
Figure 4:
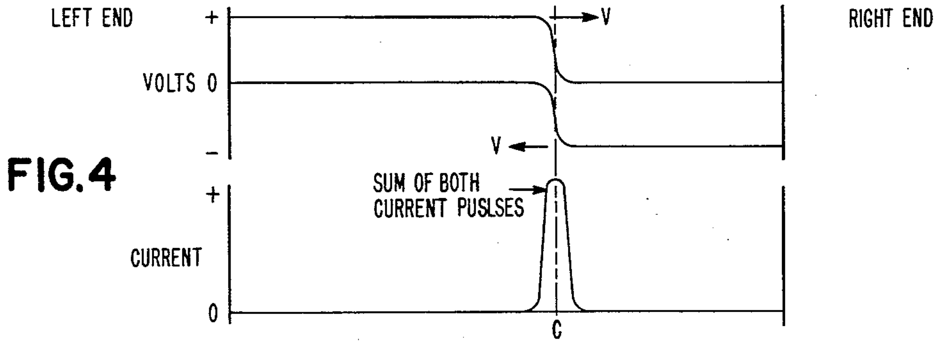
Figure 5:
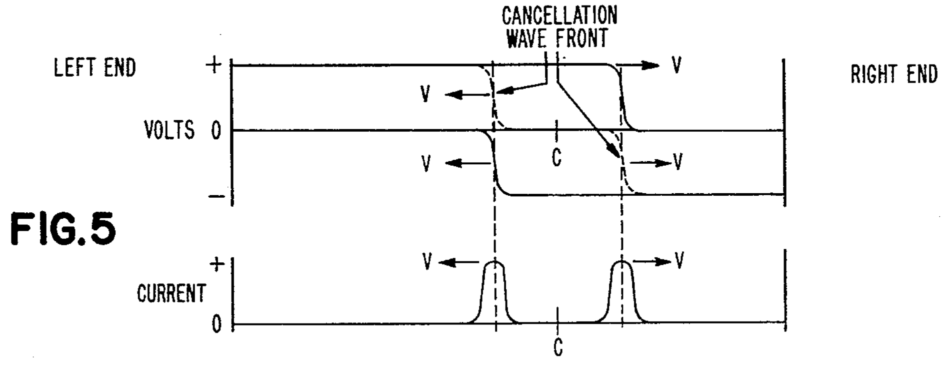

FIGS. 3–5 relate to the generation of current pulses by passing voltage wave fronts.

Briefly stated, according to the invention, two voltage wave fronts (causing current transients or pulses) are propagated and arranged to approach each other from opposite directions in magnetically coupled relation to a series of magnetizable record portions of a magnetic storage. The point at which these two fronts will coincide is determined by delaying the initiation of one of them with respect to the other. Since the magnetic effect of one transient taken by itself is insufficient to reverse the magnetic state of an elemental portion of the core storage, the point of coincidence of the two fronts will be the only portion of the storage wherein a large enough current is applied to change the state of the core. It is to be understood, of course, that if the selected elemental core portion is already in the magnetic state to which the combined current transients would switch it, no change will be effected.

Referring to the drawing, there is provided a circuit for magnetizing any of several discrete storage portions of a magnetic memory, i.e. core 21. Each unit portion represents a data storage position and is designated as S1, S2, etc., through a position "S10" (which is not used in the present embodiment). The individual circuits within the various boxes are all to be found in the prior are and therefore have not been described here since they are believed to be sufficiently well known to permit one skilled in the art to assemble these components. Further, while the invention will be described in terms of a logic diagram, it is, of course, understood that in practice some wave shaping circuits will have to be incorporated to improve any distortion introduced by the delay lines. However, in the interests of clarity, since such practice is well known these circuits have been omitted.

Magnetic core 21 is provided with a continuous winding 23 commencing at point B and extending nearly entirely around core 21 to point A. Winding 23 has sufficient impedance and inter-turn capacitance so that one unit measure of time delay is applied to a wave front as it proceeds from one bit position to another or for approximately every 27½° around core 21. Thus, the time required for a wave front to proceed from point B clockwise to point A is indicated outside core 21 and is approximately twelve unit measures of time (T); throughout the following description various periods of time will be noted and these are designated by the letter "T" preceded by a value e.g. 1T, 2T, 3T, etc. A wave front applied at point A proceeds around core 21 counterclockwise via winding 23. These times are shown inside core 21. In this manner, the simultaneous application of transients at points A and B will provide a coincidence of wave fronts at point 6T, thereby magnetizing an incremental magnetic portion of core 21. Point 6T is equivalent to storage position 5, or "S5."

Referring to FIGS. 3–5, a current pulse may be obtained in several ways as by driving a voltage step function into the delay line. The step will propagate down the line from the driver. The voltage gradient at the wave fronts will cause currents to flow in the regions between points *w* and *x*, and *y* and *z*. In FIG. 3 the pulse on the right is shown leaving its end a certain time later than the left hand pulse left its end. This particular time delay applied to the lefthand pulse uniquely defines a point of coincidence "C" on the line where the two pulses will meet. The current pulses, being of the same polarity, add at "C" as noted in FIG. 4. As the wave fronts travel past the coincidence point the voltage wave forms tends to cancel (FIG. 5). The cancellation wave fronts represent the actual voltage gradient on the line, and create current pulses departing from the point of coincidence.

In the present invention transients are applied at points A and B of winding 23. These transients produce approaching wave fronts which will coincide at a selected incremental portion of core 21 to be magnetized depending upon whether they start together or are delayed with respect to each other. Thus, delaying the start of a wave front movement from point B with respect to one initiated at point A will shift the point of magnetization of core 21 counterclockwise from point 6T (S5) and vice versa.

Figure 1:
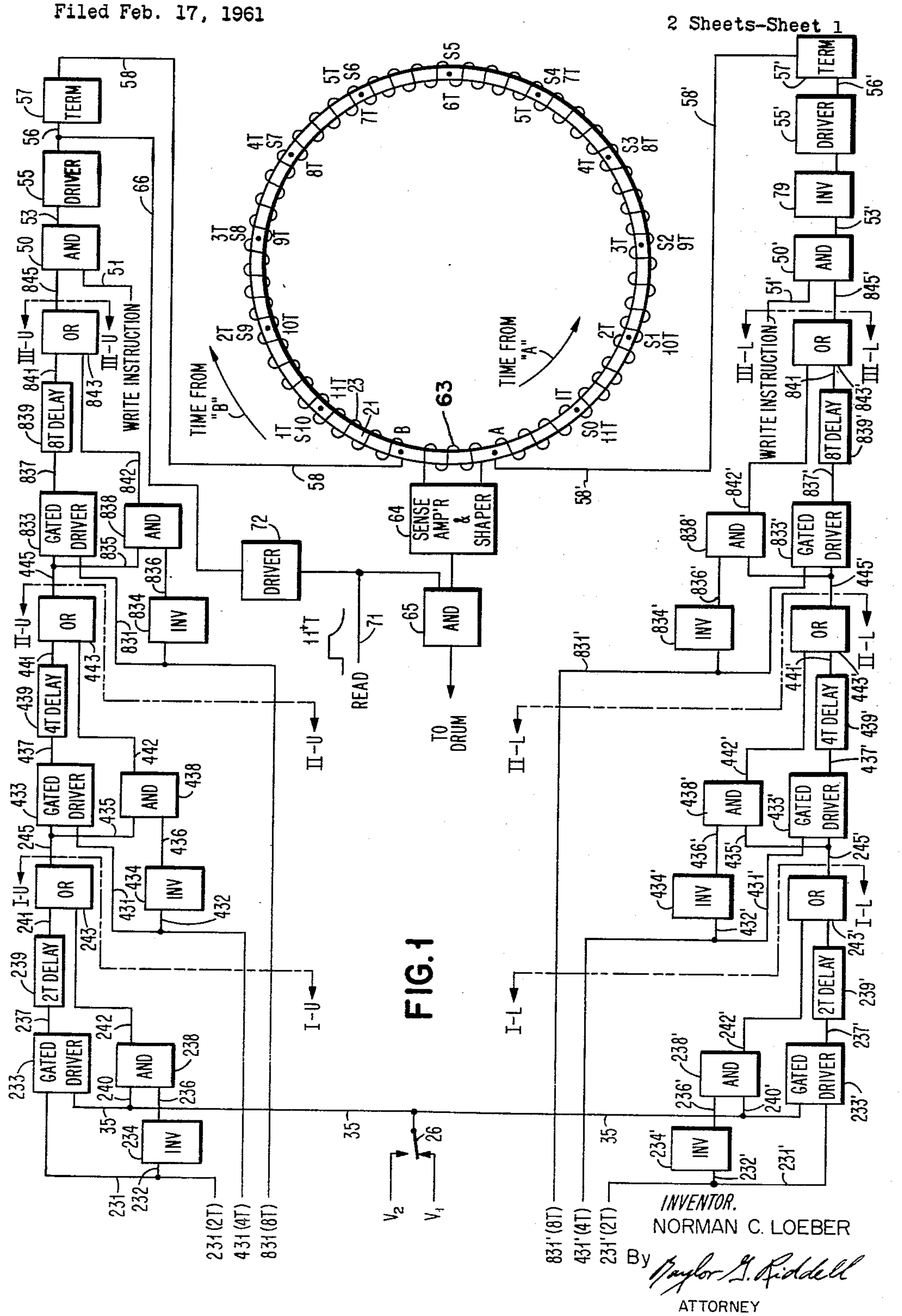
FIG. 1 shows the circuit of the invention in diagrammatic form.

In FIG. 1, the upper half of the figure shows the circuitry for applying a selected delay to the initiation of a wave front at point B, whereas the lower circuitry performs the same function relative to point A. In each instance, the time delay selection logic is the same and is comprised of three identical stages designated by the Roman numerals I, II and III followed by the letter "U" or "L" to identify the upper or lower delay selection logic, as applicable. Stages I apply a delay equivalent to two unit measures of time whereas stages II apply a delay of 4T. Stages III apply a delay of 8T. Since these stages are substantially identical, only one typical stage, I–U, will be described.

In an effort to simplify the description of the invention, the reference numerals applicable to the lower portion of the circuit have been folowed with a prime mark ('). Further, for similar components in different stages the units and tens order of the reference numerals have been retained and the hundreds order is a two, four or eight, depending upon whether it is respectively in the first, second or third stage. This convention has been employed in order to associate the amount of time delay of the particular stage with the components therein. For example, a step function applied to line 431' will generate a time delay of 4T in stage II–L.

Referring to stage I–U, there is provided a first input conductor 231 which leads directly to a gated driver 233. A second input conductor 35 also leads to driver 233. Conductor 35 is coupled to a suitable source which will generate a start signal in the form of an abrupt positive voltage change or step function. This is shown schematically as switch 26 arranged to switch from a low voltage $V_1$ to a higher voltage $V_2$. With a sharp positive change in voltage on conductor 35 an output wave front from driver 233 is generated if conductor 231 has been pre-conditioned to its proper state, i.e. relatively high or "up." The output from 233 leads via conductor 237 into a delay line 239 having two unit measures of time delay. The output from delay line 239 leads via conductor 241 to an OR gate 243. Conductor 231 is also connected to a conductor 232 connected to an inverter 234. Any output from inverter 234 appears on conductor 236 leading to a two-input AND gate 238. The other input to AND gate 238 is supplied from conductor 35 via a conductor 240. Any output from AND gate 238 appears on conductor 242 and, like conductor 241, leads to OR gate 243. The output from OR gate 243 passes to conductor 245.

*Write In*

In operation, the application of a positive step function to conductor 231 as an indication of a binary delay control bit representing a command to apply 2T delay at point B will appear simultaneously at inverter 234 and at gated driver 233. The output from inverter 234 will be a negative going function thereby preventing AND gate 238 from functioning. However, coincident with the application of a step function to conductor 231, a positive step function is applied to conductor 35 by switching from $V_1$ to $V_2$ thereby providing an output on conductor 237 in the form of a voltage change for entry into delay line 239. At two unit measures of time later the input will appear as an output step function on conductor 241 and pass via OR gate 243 to conductor 245.

Had it not been desired to select a 2T delay, the voltage on conductor 231 would have been maintained at a lower value representative of a binary "0" bit rather than having been raised to a voltage representing the presence of a binary "1" bit as noted above. Thus, the output from inverter 234 would have been correspondingly "up." With the voltage level on conductor 236 "up" and the voltage level on conductor 240 "up" as a result of the positive going step function on conductor 35, AND gate 238 would function to provide an output on conductor 242 which bypasses delay line 239. Of course, driver 233 will not operate if the voltage on 231 is "down."

In stages II the step function on conductor 245 (or 245') is utilized much as the start pulse appearing on conductor 35. Likewise, the output on conductor 445 is used to condition driver 833. For example, a delay of 4T from stage II–U is effected by a positive going voltage on conductor 431. This positive voltage, when taken together with the output on conductor 245 actuates driver 433 to pass into delay line 439. On the other hand, if a binary "0" bit were applied on conductor 431, the output from inverter 434 becomes relatively "high" thereby operating gate 438 by way of the connection 435 coupling gate 438 to lead 245.

From an understanding of these two stages, it can be seen that the raised voltage applied to conductor 431 does not know whether a binary "1" has been applied to conductor 231 or not. Thus, the voltage representation of a binary "1" on conductor 431 must be held "up" from a time corresponding to the initiation of a start pulse on conductor 35 and remain "up" long enough to accommodate the possibility that a "2T" function was applied on conductor 231, whether it was or not. Similarly the "8T" indication applied to conductor 831 must be "up" with the initiation of the start pulse. In short, prior to applying the start pulse to line 35, all inputs are "set" on their respective lines, 231, 431, etc.

The output from stage III–U appears on conductor 845 leading to a two input AND gate 50. The other input to AND gate 50 is a write instruction applied via a conductor 51. Thus, the coincident application of a write instruction on conductor 51 and a suitably delayed step function on conductor 845 will pass an output signal via lead 53 to a standard line driver 55. Driver 55 steps up the input current to provide an output current somewhat greater than half that required to magnetize one of the storage portions (S1, S2, S3, etc.) of core 21. For example, this output current might be 60% of the required core switching (magnetizing) current. The output from driver 55 is fed via a conductor 56 to a terminator circuit 57, such as a passive impedance matching network for matching the impedance of the delay selection logic to that of the core storage. Circuit 57 is connected to conductor 58 which leads into the storage at point B.

Note that in the lower logic an inverter 79 has been interposed between AND gate 50' and driver 55' in order to make the current pulses additive (see FIG. 4).

Referring to the chart shown below, there is shown the various combinations of delay control bits to be applied to the various input lines 31 (231, 231', 431, etc.) in order to select a particular data storage position on core 21. An "X" denotes a binary "1" and a "0" denotes a binary "0." Storage position S10 is not used but has been listed in the chart in parentheses to demonstrate logical extension in storage capacity of core 21. It should be noted that in making a selection, delay control bits are applied to either the upper circuitry of the drawing or the lower circuitry but not to both. This leads to simplification in the utilization of the foregoing structure in associated data processing equipment.

| Delay Control Bits | | | Time Delay At B | Data Storage Position | Time Delay at A | Delay Control Bits | | |
|---|---|---|---|---|---|---|---|---|
| 8 | 4 | 2 | | | | 8 | 4 | 2 |
| 831 | 431 | 231 | | | | 831′ | 431′ | 231′ |
| 0 | 0 | 0 | 0 | S0 | 10T | X | 0 | X |
| 0 | 0 | 0 | 0 | S1 | 8T | X | 0 | 0 |
| 0 | 0 | 0 | 0 | S2 | 6T | 0 | X | X |
| 0 | 0 | 0 | 0 | S3 | 4T | 0 | X | 0 |
| 0 | 0 | 0 | 0 | S4 | 2T | 0 | 0 | X |
| 0 | 0 | 0 | 0 | S5 | 0 | 0 | 0 | 0 |
| 0 | 0 | X | 2T | S6 | 0 | 0 | 0 | 0 |
| 0 | X | 0 | 4T | S7 | 0 | 0 | 0 | 0 |
| 0 | X | X | 6T | S8 | 0 | 0 | 0 | 0 |
| X | 0 | 0 | 8T | S9 | 0 | 0 | 0 | 0 |
| X | 0 | X | 10T | (S10) | 0 | 0 | 0 | 0 |

Taking one example from the chart above, in order to magnetize storage position S2, a voltage relatively "up" is applied to both lines 231′ and 431′. Therefore, in stage I–L and in stage II–L delay lines 239′ and 439′ are utilized to delay the initiation of a wave front at point A. Since no delay has been applied to the wave front starting at point B, it moves clockwise around the core storage via winding 23 for 6T before the wave front at point A commences its counterclockwise movement. Three unit measures of time later, these approaching wave fronts will meet at point S2 and thereby magnetize core 21 at that point i.e. at S2. As the wave fronts continue in their predetermined directions, the wave front which was initiated at point A will leave the storage at point B and proceed to the matching impedance network of terminator 57. At this point, the wave front will terminate without reflections since the impedance is substantially matched. Likewise, the wave front initiated at point B will be terminated in circuit 57′.

*Readout*

In order to read out the information as thus recorded, a second winding 63 has been provided on core 21. Winding 63 leads to an amplifying and shaping circuit 64 connected to an AND gate 65. In reading out information from the storage, a wave front sufficient by itself to magnetize core 21, is applied at point B. This wave front is of a polarity which magnetizes core 21 in an opposite direction from that effected under the coincident application of the two fronts at a selected storage position. Thus, when the wave front applied at point B reaches the selected position i.e. S2 in the example, the magnetic condition of core 21 will be reversed by the readout wave front. This magnetic reversal is sensed by winding 63 and as amplified and shaped passes to AND gate 65.

The structure for applying a readout wave front at point B, has been provided by a conductor 71 connected to a common point between AND gate 65 and a driver 72. Driver 72 is capable of generating an output current substantially greater than necessary to magnetize core 21. In the present invention this may be 120% of the necessary magnetizing current. The output from driver 72 leads to a common point between driver 55 and terminator 57, through terminator 57 onto line 58. The read instruction to be applied to conductor 71 is simultaneously applied to AND gate 65, and by maintaining the read instruction for a time slightly in excess of 11T any reversals in the magnetic state of core 21 that are sensed will be gated out to be recorded for example on a magnetic data processing drum or the like. Termination of the read instruction should decrease gradually rather than abruptly so as not to generate a read out pulse in the opposite direction which would leave the storage magnetized in the direction to which it will be driven by coinciding wave fronts. Likewise, the write instruction should also decrease gradually rather than sharply. In the foregoing manner then the information recorded in core 21 may be read out serially and recorded for subsequent use on a magnetic drum or other data processing device.

Figure 2:
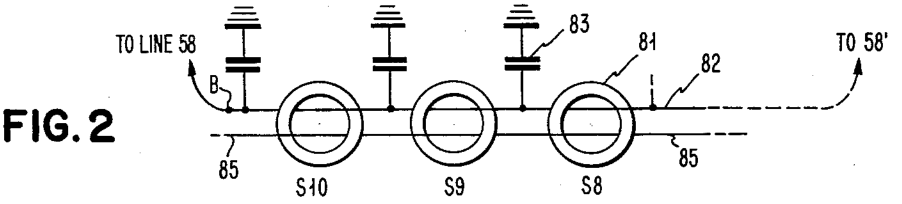
FIG. 2 shows another embodiment.

Instead of using a single core such as core 21 it is entirely possible that in a specific application a number of individual cores 81 as shown in FIG. 2 may be more desirable. In that instance, a single conductor 82 can be passed through or wound upon each of these cores and one unit measure of time delay applied between them by grounding the winding between each core through a capacitance 83 of appropriate value. A readout winding 85 is provided in magnetic coupling relation with all cores 81 and appropriately wound. Two write windings can also be used rather than one.

Having thus described the invention with reference to a preferred embodiment thereof, it will be understood by those skilled in the art that the foregoing and other changes in the form and details may be made therein without departing from the spirit and scope of the invention.

What is claimed is:

1. magnetic digital information storage configuration, said storage configuration having a plurality of incremental magnetizable portions arranged in a predetermined sequence, common conductive means coupled to all said portions and arranged to magnetically couple both a first and second pulse to any of said portions to tend to magnetize said portions to a predetermined magnetic state, means connected to one end of the conductive means to generate a first pulse, means connected to the opposite end of the conductive means to generate a second pulse in a manner to meet said first pulse, and means arranged to selectively delay one of said pulses with respect to the other of said pulses to combine their respective magnetic coupling to magnetize a selected one of said portions to said predetermined state.

2. The invention according to claim 1 further including means for reversing the magnetic state of said selected portion, and means for detecting said reversal.

3. A magnetic storage arrangement, said storage having a plurality of incremental magnetizable portions arranged in a predetermined sequence, each of said portions being formed of material having substantially rectangular hysteresis characteristics with a switching threshold common conductive means coupled to said portions and arranged to tend to magnetize each of said portions to a predetermined magnetic state under application of a pulse thereto, means for applying a first and second pulse to opposite ends of said conductive means, each of said pulses supplying less than sufficient current to effect said predetermined state of magnetization while supplying enough current therefor when both are combined, time delay means interposed between said portions and arranged to delay said pulses one unit measure of time in travelling from one said portion to the next, and means arranged to selectively delay one of said pulses with respect to the other said pulse to combine their respective magnetizing effects to selectively magnetize one of said portions.

4. The invention according to claim 3 further including means for reversing the magnetic state of said selected portion, and means for detecting said reversal in relation to the location of said selected portion thereby identifying said portion.

5. A magnetic storage configuration for digital information, said configuration comprising a series of magnetizable portions, common conductive means disposed in magnetic coupling relation to all said portions, means connected to opposite ends of the conductive means for propagating pulses on said conductive means, said propagating means being connected to direct said pulses to pass each other on said conductive means to magnetize one of said portions to a first magnetic state, and means for delaying the initiation of one of said pulses with respect to the other to determine the portion so magnetized.

6. The invention according to claim 5 including means for reversing the magnetic state of said selected portion, and means for detecting said reversal.

7. A magnetic data storage configuration comprising a plurality of magnetizable storage portions each said portion being of a material having a substantially rectangular hysteresis characteristic, common conductive means magnectically coupled to all said portions, means connected to the conductive means to propagate a pair of half-select current pulses from opposite directions thereon to magnetize one of said portions to a first magnetic state, said propagating means including means constructed and arranged to delay the initiation of one of said pulses in varying degree with respect to the other to select the portion to be magnetized, readout means connected to reverse the magnetic state of any portion so magnetized, and means for sensing such reversals.

8. A magnetic data storage configuration including a magnetizable core of a material having a substantially rectangular hysteresis characteristic said core having a plurality of magnetizable storage portions, common conductive means wound upon said core in magnetic coupled relation to all said portions, means connected to propagate a pair of half-select current pulses from opposite directions on said conductive means to magnetize one of said portions to a first magnetic state, said propagating means including means constructed and arranged to delay the initiation of one of said pulses in varying degree with respect to the other to select the portion to be magnetized, readout means connected to reverse the magnetic state of any portions so magnetized, and means for sensing such reversals.

9. A magnetic data storage configuration comprising a plurality of magnetizable cores each said core being of a material having a substantially rectangular hysteresis characteristic, common conductive means magnetically coupled to all said cores, a grounded condenser interposed between each said core and connected to said conductive means to delay pulses traveling therebetween, means connected to propagate a pair of half-select current pulses from opposite directions on said conductive means to magnetize one of said cores to a first magnetic state, said propagating means including means constructed and arranged to delay the initiation of one of said pulses in varying degree with respect to the other to select the core to be magnetized, readout means coupled to said conductive means and connected to reverse the magnetic state of any core so magnetized, and means for sensing such reversals.

References Cited in the file of this patent

UNITED STATES PATENTS 3,736,880 Forrester ---------------- Feb. 28, 1960

OTHER REFERENCES

Publication I: Proceedings of the Eastern Joint Computer Conference, Dec. 10–12, 1956, pp. 120–123.